United States Patent [19]

Meyer et al.

[11] 4,287,315

[45] Sep. 1, 1981

[54] POLYAMIDE BLENDS

[76] Inventors: Rolf-Volker Meyer; Rolf Dhein; Friedrich Fahnler, all of Krefeld, Fed. Rep. of Germany

[21] Appl. No.: 68,938

[22] Filed: Aug. 23, 1979

Related U.S. Application Data

[63] Continuation-in-part of Ser. No. 56,247, Jul. 10, 1978, abandoned, which is a continuation of Ser. No. 942,628, Sep. 15, 1978, abandoned.

[30] Foreign Application Priority Data

Sep. 20, 1977 [DE] Fed. Rep. of Germany ....... 2742177

[51] Int. Cl.$^3$ .............................................. C08L 77/00
[52] U.S. Cl. .................................. 525/183; 260/42.52
[58] Field of Search .................... 260/857 L, 857 UN; 525/183

[56] References Cited

U.S. PATENT DOCUMENTS

| | | | |
|---|---|---|---|
| 3,294,754 | 12/1966 | Naarmann | 260/857 L |
| 3,375,219 | 3/1968 | Robb | 260/857 L |
| 3,516,961 | 6/1970 | Robb | 260/857 L |
| 3,548,028 | 12/1970 | Itabashi | 260/857 L |
| 3,681,216 | 8/1972 | Galiano | 260/857 L |

FOREIGN PATENT DOCUMENTS

| | | | |
|---|---|---|---|
| 750501 | 8/1966 | Canada | 260/857 L |
| 1241361 | 8/1971 | United Kingdom | 260/857 L |
| 1284489 | 8/1972 | United Kingdom | 260/857 L |

*Primary Examiner*—Paul Lieberman

[57] ABSTRACT

Polymer blends with improved impact strength consisting essentially of a polyamide and a copolymer of an α-olefine, an amide and an ester of an α,β-unsaturated carboxylic acid.

9 Claims, No Drawings

POLYAMIDE BLENDS

This is a continuation-in-part of application Ser. No. 056,247 filed July 10, 1978 which in turn is a continuation of application Ser. No. 942,628 filed Sept. 15, 1978 and now abandoned.

This invention relates to polymer blends of polyamides and amide groups containing olefinic copolymers, which have great toughness with excellent homogeneity.

The mechanical properties of polymers frequently depend on their preliminary treatment. The impact strength of moulded polyamide products, for example, depends to a considerable extent on their water content.

In the anhydrous state, moulded products, especially those produced from highly fluid, particularly highly crystalline polyamides of medium molecular weight, are comparatively sensitive to impact. There is therefore a need for highly fluid polyamide compounds which can be rapidly processed. Particularly there is a need for the production of moulded products which have a high impact strength in the dry state. Polyamides having high tensile strength, high heat distortion temperature, resistance to organic solvents, and easy processability combined with high impact strength and flexibility are of particular interest.

Various processes for increasing the toughness and flexibility of polyamides are already known. It has been attempted, for example, to incorporate low molecular weight plasticizers into polyamides. But this fails to provide a satisfactory solution to the problem because most of the plasticizers suitable for synthetic polymers are not sufficiently compatible with polyamides and tend to separate from them during processing. On the other hand, compatible plasticizers which form true solutions with polyamides in most cases have a deleterious effect on the mechanical properties of polyamides. Highly polar substances of low molecular weight, such as water or dimethylformanide, have a powerful plasticizing action, but cannot be incorporated into the polyamides until these have been moulded. This is because processing of the pretreated polyamide granulate would lead to bubbles in the moulded product due to the relatively low boiling points of these plasticizers.

Moreover, this method is generally expensive and time consuming. It is also unsuitable for the production of moulded products having thick walls owing to the irregular distribution of the plasticizer in the moulded product. Furthermore, these plasticizers partly escape from the moulded polyamides on account of their relatively high vapour pressure.

The use of plasticizers has proved to be particularly disadvantageous for the production of high quality foils.

It is also known from the U.S. Pat. No. 3294 754 to mix copolymers of ethylene, $\alpha,\beta$ unsaturated carboxylic amides and optionally (meth) acrylates having waxy properties, melting points below 100° C. with polyamides. These low molecular weight waxy products do not improve the impact strength of polyamides.

It has also been attempted to improve the impact strength of polyamides by the addition of polymers such as polyethylene and copolymers of vinyl acetate and ethylene (German Auslegeschrift No. 1,138,922). Although very vigorous kneading is necessary for preparing such mixtures, separation still occurs on further processing, e.g. in injection moulding and particularly in the manufacture of foils.

Moulded products obtained from such mixtures therefore have a tendency to white fracture. In the manufacture of foils, rapid separation of the components immediately after extrusion from the nozzle is observed even when high operating pressures are used.

Copolymers of ethylene and (meth)acrylic acid esters have been used to increase the flexibility of polyamides in the freshly extruded state.

According to U.S. Pat. No. 3,742,916 and German Pat. No. 1,669,702=U.S. Pat. No. 3,700,751 a certain improvement is achieved by using copolymers of ethylene and (meth)acrylic acid esters. The notched impact strength in the freshly extruded state is still unsatisfactory, however, and there is a marked tendency for the composition to separate into its components.

The flexibility of polyamides can also be increased by the introduction of polyethylenes which contain acid groups, e.g. copolymers of ethylene and unsaturated acids or polyethylene which has been grafted with unsaturated acids. Although such mixtures are more finely disperse and show much less white fracture under stress than the mixtures described above, they have considerably poorer mechanical properties such as elastic modulus, tensile strength, hardness and rigidity than the original polyamides, apart from the slightly improved toughness and flexbility.

Copolymers of ethylene, (meth)acrylic acid and (meth)acrylates, for example, have also been added as plasticizing components to polyamides (German Auslegeschrift No. 1,241,606)=British Pat. No. 998439. A substantial improvement in the impact strength, together with good homogeneity, has been achieved in this way.

The preparation of copolymers which contain acrylic acid is, however, associated with considerable difficulties which are mainly due to the fact that acrylic acid and its homologues are corrosive and damage the metering apparatus and reactors.

Furthermore, owing to the presence of free carboxyl groups in the olefinic copolymers, the compounding installations and the injection moulding machines are subject to more rapid wear due to corrosion, and this may cause interruptions in production.

The blends disclosed in U.S. Pat. No. 3,845,163 and French Pat. No. 1,504,113 have basically the same disadvantages as well as additional disadvantages owing to the fact that they contain (meth)acrylic acid partly in the form of a metal salt. It is well known that the resistance to surface leakage falls so sharply in the presence of metal ions that it is almost impossible to use these products in the electrical field. Moreover, most of the metal ions used for neutralisation of the acid groups, e.g. $Zn^{2+}$, $Ba^{2+}$, $Cd^{2+}$ and $Hg^{2+}$, are physiologically harmful. Products of this type would therefore be prohibited for use in the packaging of food and the manufacture of toys.

It has now been found that impact resistant, very homogeneous polymer blends which do not have the disadvantages mentioned above are obtained when polyamides are compounded by the usual methods with olefinic copolymers which have amide groups.

This invention therefore relates to polymer blends with improved impact strength consisting essentially of I. from 70 to 99% by weight, preferably from 80 to 95% by weight of a polyamide and II. from 1 to 30% by weight, preferably from 5 to 20% by weight of a high molecular weight olefinic copolymer having a melting point of at least 100° C. and a melt index of from 1–20, preferably 3–12 g/10 min. at 190° C. measured according to DIN 53 735 consisting of:

(a) from 65 to 98% by weight, preferably from 80 to 96% by weight of an α-olefine, (b) from 1 to 15% by weight, preferably from 2 to 8% by weight of an amide of an α,β-unsaturated carboxylic acid and (c) from 1 to 20% by weight, preferably from 2 to 15% by weight of an alkyl- or alkenyl-ester of an α,β-unsaturated carboxylic acid, the sum of I. and II. and the sum of a)-c) being in each case always 100% by weight.

Polyamides used for the purpose of this invention may be linear polycondensates of lactams having from 6 to 12 carbon atoms or the usual polycondensates of diamines with dicarboxylic acids, such as 6,6-, 6,8-, 6,9-, 6,10-,6,12-, 8,8- and 12,12-polyamide, or polycondensates of aromatic dicarboxylic acids, such as isophthalic acid or terephthalic acid, with diamines, such as hexamethylene diamine or octamethylenediamine, or polycondensates of araliphatic starting materials, such as m- or p-xylylene diamines, with adipic acid, suberic acid or sebacic acid, or polycondensates based on alicyclic starting materials, such as cyclohexane dicarboxylic acid, cyclohexane diacetic acid, diamino-dicyclohexylmethanes or isophorone diamine. It is preferred to use polyamides having a relative viscosity of at least 2.5, most preferably at least 3.5 (determined on a 1% solution in m-cresol at 25° C.). Mixtures of the above-mentioned polyamides or of copolyamides obtained from the above-mentioned components may equally well be used.

6-Polyamide and/or 6,6-polyamide are preferably used.

α-Olefines having from 2 to 20 carbon atoms are preferably suitable for the preparation of the copolymers, e.g. ethylene, propylene, butene-1, isobutene, pentene-1, hexene-1, decene-1, 4-methyl-butene-1, 4-methyl-pentene-1, vinyl cyclohexane, styrene, α-methylstyrene or styrenes substituted with lower alkyl groups.

Mixtures of the above-mentioned olefines may also be used.

The amides used are preferably unsubstituted amides of α,β-unsaturated acids having from 3 to 5 carbon atoms, e.g. methacrylamide or acrylamide.

$C_1$–$C_8$, preferably $C_1$–$C_4$-alkyl or alkenyl esters of a α,β-unsaturated acids having from 3 to 5 carbon atoms, e.g. methyl-, ethyl- or butyl-(meth) acrylate are preferably used for the preparation of the copolymers.

The olefinic copolymers may be prepared by known methods, which have been fully described in the literature.

The present invention is by no means restricted to copolymers which are obtained by the direct copolymerisation of α-olefines with α,β-unsaturated comonomers. The modified polyolefines containing amide groups may also be obtained by the grafting, e.g. of acrylamide and of other monomers suitable for grafting, on a polyolefine as graft substrate. Suitable processes have been described, for example, in German Offenlegungsschrift DT-OS No. 27 34 105. Both the polyamide components and the olefinic copolymers which contain amide groups should preferably be high molecular weight materials.

Amide group containing olefine copolymers which may be used with the polyamides to form compatible mixtures which have good thermoplastic properties shall be illustrated by the following examples, which are by no means exhaustive:

ethylene/acrylamide/tert-butylacrylate copolymers ethylene/methacrylamide/tert-butylacrylate copolymers ethylene/acrylamide/methylmethacrylate copolymers ethylene/acrylamide/ethylacrylate copolymers ethylene/styrene/acrylamide/ethylacrylate copolymers ethylene/butene-1/methacrylamide/ethylacrylate copolymers propylene/acrylamide/ethyl acrylate copolymers butene-1/acrylamide/ethylacrylate copolymers Amide groups containing olefinic copolymers are also suitable if they contain small quantities of (meth)-acrylic acid chemically fixed as additional comonomer.

Preferred blending components are olefinic copolymers consisting of from 80 to 96% by weight of ethylene, from 2 to 8% by weight of the amide of an α,β-unsaturated carboxylic acid and from 2 to 15% by weight of a $C_1$–$C_8$-alkyl ester of an α,β-unsaturated carboxylic acid, the sum of the % by weight being always 100%.

Particularly preferred blending components are olefinic copolymers which contain ethylene and acrylamide and, as the ester component, esters of acrylic acid with $C_1C_4$ alcohols.

Whereas many polymer blends can only be processed into usable products by injection moulding, in other words at high pressures to prevent separation of the components, the compatibility of the olefinic copolymers according to the present invention in blends with polyamides is surprisingly so high that these substances can even be processed by conventional techniques into homogeneous foils which are transparent at the most common thickness of from 10 70 μm.

The polyamide blends according to the present invention may be prepared by mixing the starting components at temperatures above the melting point of the polyamide, e.g. at temperatures of from 200° to 320° C. in particular from 250° to 290° C.

The blends may be prepared in conventional screw extruders. Both single screws and double screws are suitable, although double screw extruders are preferred.

Other mixing apparatuses suitable for plasticizing synthetic materials may also be used. Into the inventive blends additives such as stabilizers, mould release agents, lubricants, crystallisation accelerators, plasticizers, pigments or dyes or fillers such as glass fibres or asbestos may be incorporated.

Monofils and other shaped products from such polymer blends show no white fracture on breakage or cutting and no signs of separation into their components. Compared with shaped products obtained from known polyamide-polyolefin mixtures, they have a very satisfactory surface structure. Furthermore, compared with shaped products of polyamides, their water absorption capacity is reduced and they have a substantially increased notch impact strength in the dry state. The compounds are suitable for processing in extruders and injection moulding apparatuses for the manufacture of moulded products such as housings, panels, filaments, tapes or pipes and for the manufacture of transparent foils.

EXAMPLE 1

95 parts by weight of a 6-polyamide having a relative viscosity of 2,9 and a notched impact strength determined according to DIN 53 453 of 2-3 kJ/m² and 5 parts of weight of a copolymer of 95.5 parts by weight of ethylene, 2.0 parts by weight of acrylamide and 2.5 parts by weight of the tertiary butyl ester of acrylic acid (mp. about 120° C., melt index 7 g/10 min at 190° C.).

are mixed for 5 minutes in a mixing apparatus. The mixture of components thus obtained is kneaded in a two-shaft extruder of type ZSK 53 at 90 revs/min and at 260° C., and extruded. The melt is spun into a waterbath, granulated, and then dried to a water content of 0.05% by weight at 80° C. under vacuum. Based on the polyamide content, the product has a relative viscosity of 2.9, determined on a 1% solution in m-cresol at 25° C. in an Ubbelohde viscosimeter. Alternating bending tests on freshly extruded samples shown that the polymer blend has a very high homogeneity.

The notched impact strength determined according to DIN 53 453 is 6.0 kJ/m².

EXAMPLE 2

Example 1 was repeated, except that the basic polyamide used was a 6-polyamide having a relative viscosity of 4.2 (notched impact strength according to DIN 53 453: 3-4 KJ/m²).

Alternating bending tests on freshly extruded samples show that the polymer blend has a very high homogeneity. A notched impact strength according to DIN 53 453 of 10.8 kJ/m² was recorded.

EXAMPLE 3

90 Parts by weight of a 6-polyamide having a relative viscosity of 2.9 determined as described above and 10 parts by weight of the olefinic copolymer used in Example 1 were compounded as described in Example 1.

Alternating bending tests carried out on freshly extruded samples of the resulting polymer blend showed it had good homogeneity; the notched impact strength according to DIN 5 453 was 9.1 KJ/m². EXAMPLE 4

90 Parts by weight of a 6-polyamide having a relative viscosity of 4.2 determined as described above and 10 parts by weight of the olefinic copolymer used in Example 1 were compounded by a method analogous to that described in Example 1.

Alternating bending tests on freshly extruded samples of the resulting polymer blend showed that it had good homogeneity. The notched impact strength according to DIN 53 453 was 17.5 kJ/m².

EXAMPLES 5 to 8

90 Parts by weight of a polyamide having a relative viscosity of 4.2 determined as described above were mixed and compounded as described in Example 1 with 10 parts by weight of various olefinic copolymers the compositions of which are shown in Table 1.

The homogeneity and notched impact strength of the polymer blends obtained are again shown in Table 1.

TABLE 1

| | Composition of the olefinic copolymer | | | | | | |
|---|---|---|---|---|---|---|---|
| Example | Ethylene parts by weight | Acrylamide parts by weight | Ethyl acrylate parts by weight | t-butyl acrylate parts by weight | Mp* °C. | Homogeneity of the polymer blend | Notched impact strength kJ/m² |
| 5 | 95.5 | 2.0 | 2.5 | — | 118 | good | 16.5 |
| 6 | 89.8 | 4.2 | 6.0 | — | 110 | good | 17.3 |
| 7 | 89.0 | 8.0 | 3.0 | — | 130 | good | 16.9 |
| 8 | 89.0 | 4.5 | — | 6.5 | 109 | good | 19.5 |

*Softening range ± 5° C. around the given melting point (Mp).

What we claim is:

1. Polymer blends with improved impact strength consisting of:
   (I) from 70 to 99% by weight of at least one polyamide and
   (II) from 1 to 30% by weight of a high molecular weight olefinic copolymer having a melting point of at least 100° C. and a melt index of from 1–20 g/10 min. at 190° C. measured according to DIN 53 735 consisting of:
   (a) from 65 to 98% by weight of at least one α-olefine,
   (b) from 1 to 15% by weight of at least one amide of an α-β-unsaturated carboxylic acid and
   (c) from 1 to 20% by weight of at least one alkyl or alkenyl ester of an α,β-unsaturated carboxylic acid, the sum of (I) and (II) and the sum of (a)–(c) being in each case always 100% by weight.

2. Blends as claimed in claim 1, wherein the polyamide is 6-polyamide and/or 6,6-polyamide.

3. Blends as claimed in claim 1, wherein component (b) is an amide of an α,β-unsaturated acid having from 3 to 5 carbon atoms.

4. Blends as claimed in claim 1, wherein component (c) is a $C_1$-$C_4$ alkyl or alkenyl ester of an α,β-unsaturated acid having from 3 to 5 carbon atoms.

5. Blends as claimed in claim 1, wherein the olefinic copolymer consists of from 80 to 96% by weight of a α-olefine, from 2 to 8% by weight of the amide of an α,β-unsaturated carboxylic acid and from 2 to 15 parts by weight of a $C_1$-$C_8$ alkyl ester of an α,β-unsaturated carboxylic acid, the sum of the % by weight being always 100%.

6. Blends as claimed in claim 1 wherein the olefinic copolymer contains ethylene, acrylamide, and an ester of acrylic acid with $C_1$-$C_4$ alcohol.

7. Blends as claimed in claim 1 consisting of from 80 to 95% by weight of component I and from 5 to 20% by weight of component II.

8. A thermoplastic moulding compound when prepared from a blend as claimed in claim 1.

9. A transparent foil prepared from a blend as claimed in claim 1.

* * * * *